Jan. 21, 1936.  D. A. GURNEY ET AL  2,028,154
CART
Filed Aug. 18, 1933
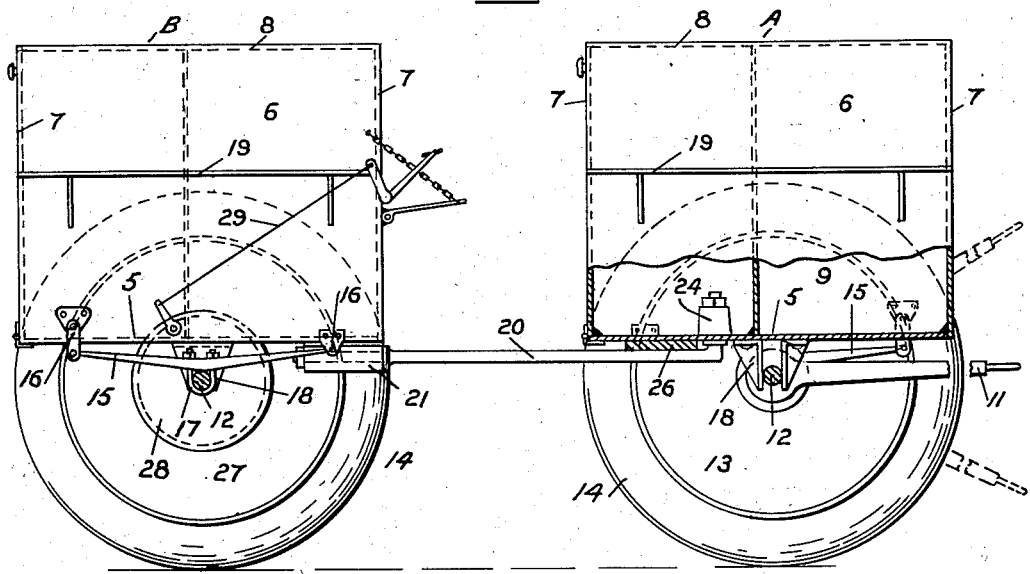
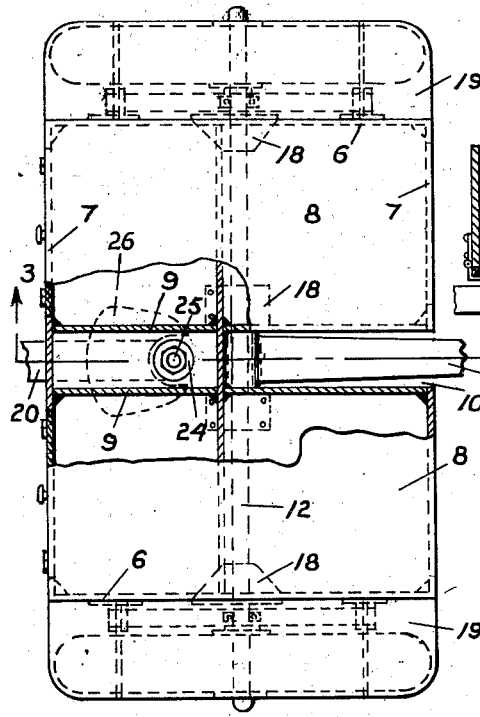
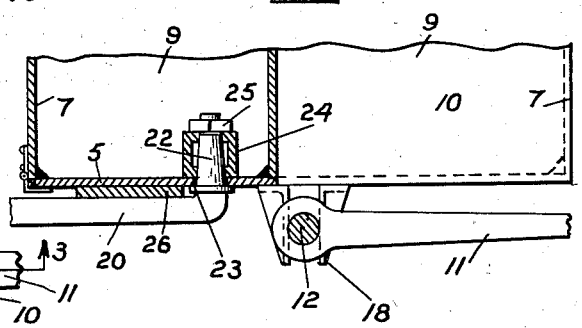
Inventors
Dayton A. Gurney
Thomas A. Conlon
By W. N. Roach
Attorney Patented Jan. 21, 1936

2,028,154

UNITED STATES PATENT OFFICE 2,028,154

CART

Dayton A. Gurney, Caro, Mich., and Thomas A. Conlon, Silver Spring, Md.

Application August 18, 1933, Serial No. 685,768

1 Claim. (Cl. 280—33.4)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a cart and more particularly it has reference to the draft and trailer connections thereof.

The principal object of the invention is to provide a general utility cargo cart, two or more of which may be coupled in series to form a strong, self-supporting wagon or train, readily coupled and uncoupled, whose connections to draft and to each other allow the axles to move relative to one another and to draft so as to permit traveling over uneven ground.

A further object is to provide a simple and strong body having a spring suspension and a draft coupling on the axle.

With the foregoing and other objects in view, as may hereinafter more fully appear, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a view in side elevation and partly in section showing two cargo carts coupled in train.

Fig. 2 is a plan view partly in section of the lead cart.

Fig. 3 is a sectional view on the line 3—3 of Fig. 2 with the spring suspension omitted.

Referring to Fig. 1 there is shown a wagon consisting of a lead cart A and a trailer cart B. The carts are substantially alike except for the draft and trailer connections.

The cart A consists of a rectangular body, preferably formed of metal plates and including a bottom 5, sides 6—6, ends 7—7 and a top 8. A pair of spaced vertical plates 9—9 extends longitudinally of the cart at its center. In the forward part of the body the bottom and top plates do not extend across the plates 9 so that an opening 10 is provided to permit movement of a drawbar 11 that is pivotally mounted on an axle 12. The axle is carried by wheels 13 preferably having pneumatic tires 14.

The body is supported on the axle by means of a pair of semi-elliptic springs 15—15, one at each side of the body. The springs are each mounted on shackles 16—16 fastened to the side plate 6 and are centrally secured to the axle by clips 17—17. A number of sets of spaced guides 18—18 secured to the bottom plate 5 straddle the axle and serve to transmit the draft of the axle to the body.

Horizontally disposed plates 19—19 secured to respective side plates 6 of the body overlie one of the wheels 13 and serve as mudguards as well as foot rests for passengers seated on the top 8 of the body.

The drawbar 20 of the cart B is swivelly mounted in a socket member 21 secured to the body of the cart. The front end of the drawbar terminates in a pintle 22 adapted to extend through an aperture 23 in the bottom plate 5 of the cart A and through a bearing 24 between the plates 9. The pintle is held in place by means of a nut 25. A wearing plate 26 is secured to the under side of the bottom plate 5.

The wheels 27 of the cart B are provided with brakes, indicated at 28, and operated by the linkage 29.

The carts are especially adapted for carrying concentrated heavy loads such as artillery ammunitions. The drawbar 11 by virtue of its connection with the axle transmits the pull directly to the center part of the cart and eliminates the lever arm which is present when the drawbar is connected to the body forwardly of the axle.

We claim:

A cart including an axle, wheels on the axle, a drawbar pivotally movable on the axle, a body resiliently mounted on the axle and movable vertically with respect thereto and draft-transmitting members rigidly fixed on the under side of the body, said members slidably engaging the front and rear sides of the axle.

DAYTON A. GURNEY.
THOMAS A. CONLON.